July 24, 1956 M. POIRIER 2,756,068
TANDEM WHEEL SUSPENSION
Filed March 24, 1955 3 Sheets-Sheet 1

INVENTOR.
MAURICE POIRIER,
BY
O O Martin
ATTORNEY.

July 24, 1956 M. POIRIER 2,756,068
TANDEM WHEEL SUSPENSION
Filed March 24, 1955 3 Sheets-Sheet 2
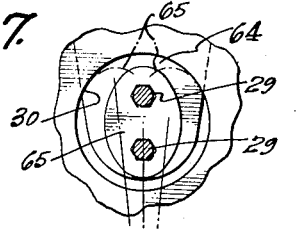
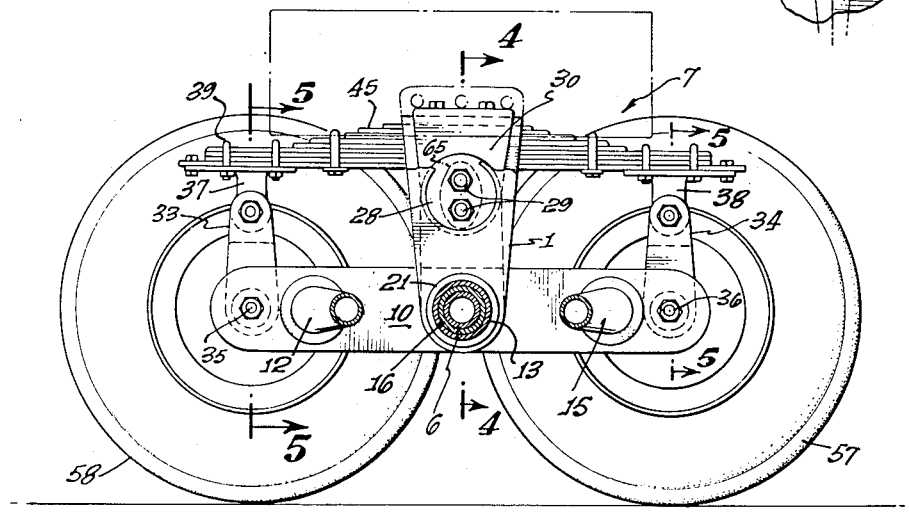
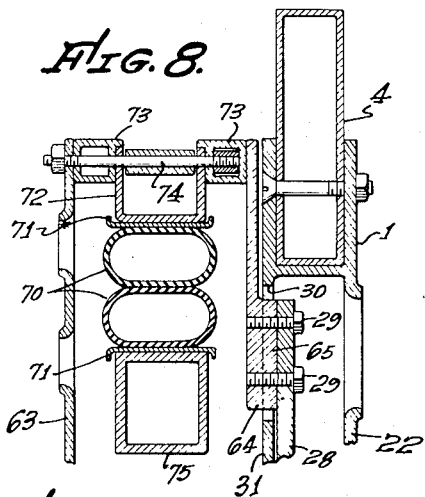
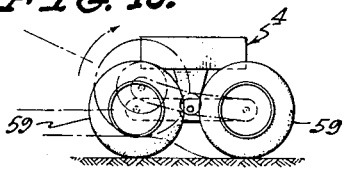
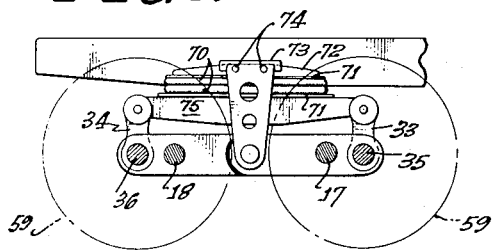
Maurice Poirier,
INVENTOR.
BY
ATTORNEY.

July 24, 1956 M. POIRIER 2,756,068
TANDEM WHEEL SUSPENSION
Filed March 24, 1955 3 Sheets-Sheet 3
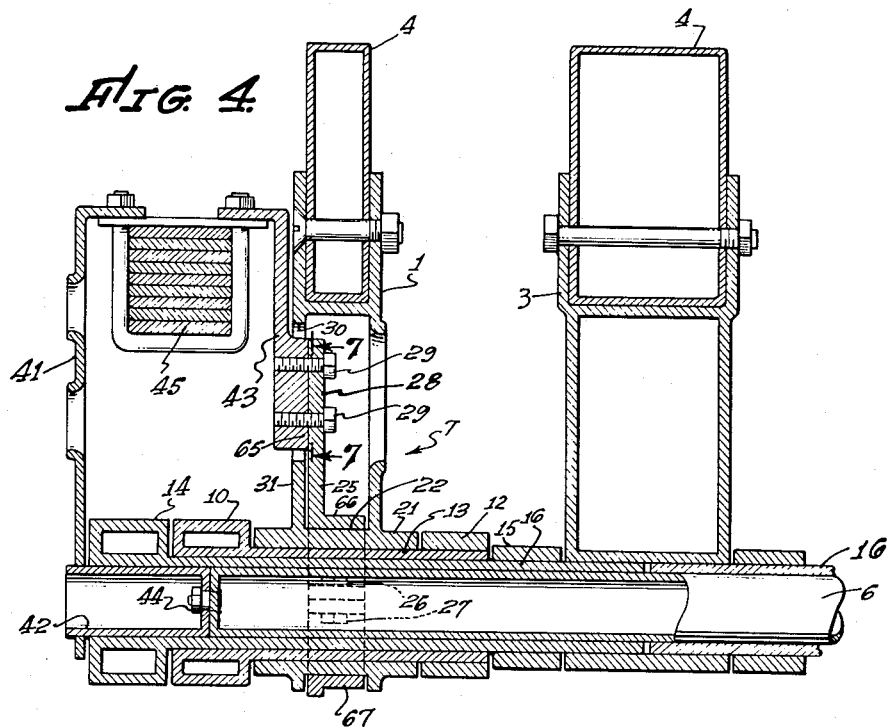
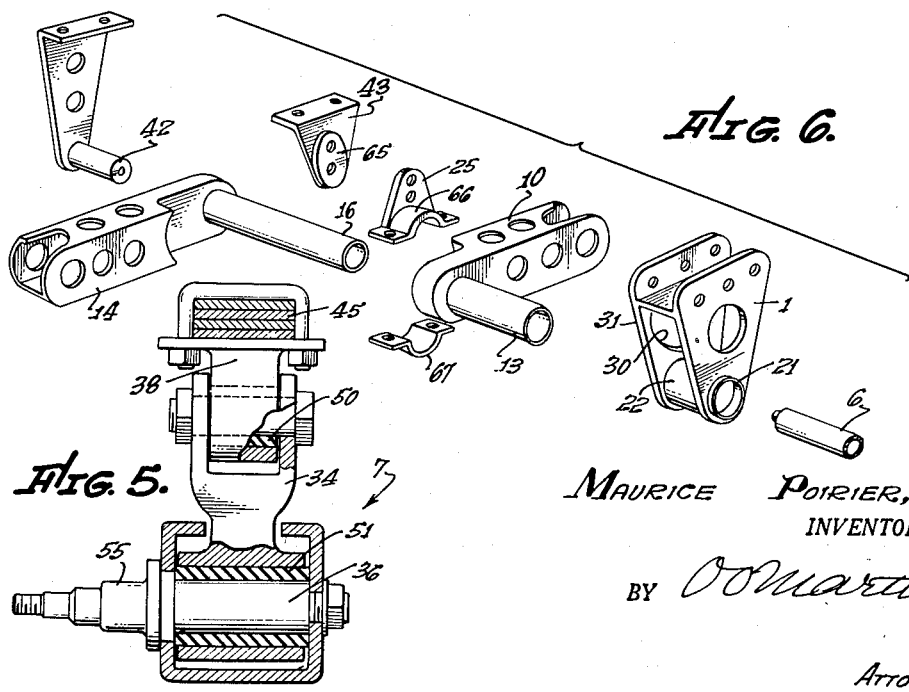
Maurice Poirier,
INVENTOR.
BY *O O Martin*
ATTORNEY.

United States Patent Office 2,756,068
Patented July 24, 1956

2,756,068

TANDEM WHEEL SUSPENSION

Maurice Poirier, Burbank, Calif.

Application March 24, 1955, Serial No. 496,406

8 Claims. (Cl. 280—104.5)

This invention relates to wheel suspensions of heavy duty vehicles, such as trailers and semi-trailers employing tandem wheel arrangements.

It is the general object of the invention to provide a novel type of wheel suspension capable of independent spring controlled action between adjacent wheels as well as between any one of the wheels and the frame of the vehicle. More particularly, it is the object of the invention to provide a wheel suspension of the type specified which is extremely resilient, each part thereof being free to yield readily to absorb road shocks without any undue stress on the vehicle frame or any other part of the wheel suspension.

Another object is to provide a structure which may be separately assembled and readily attached to the vehicle frame thereby facilitating suspension from the vehicle frame and transfer thereof from one vehicle to another.

A further object is to provide a tandem wheel suspension having less unsprung weight, greater flexibility and having most of its parts detachable and interchangeable for convenience in manufacturing, assembling and shipping.

These and other objects, as well as the many advantageous features of the invention will appear upon perusal of the following detailed description and by referring to the drawings in which a preferred form of the invention is illustrated.

In the drawings:

Fig. 3 is a view taken substantially on lines 3—3 of Fig. 1, in the direction of the arrows;

Fig. 4 is a cross sectional view through the center of the device taken on lines 4—4 of Fig. 3 in the direction of the arrows;

Fig. 5 is a fragmentary view taken on line 5—5 of Fig. 3 in the direction of the arrows;

Fig. 6 is an extended plan view of the various parts which combine to form the suspension of each wheel; and Figs. 7 to 11 illustrate sub-assemblies of the wheel suspension the importance of which is hereinafter fully described.

Figure 1:
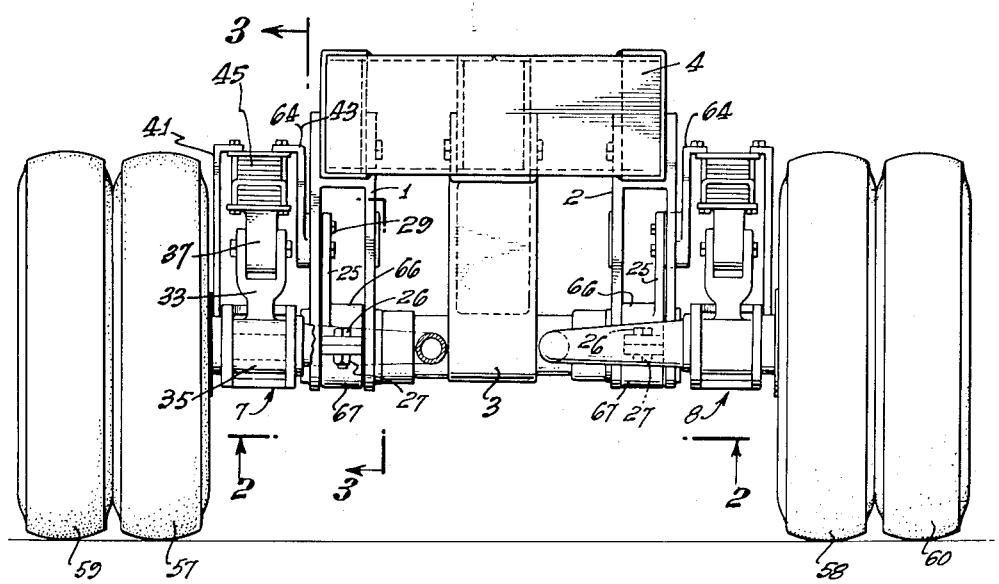
Fig. 1 is a front or rear end elevational view of the device of the invention.
Figure 2:
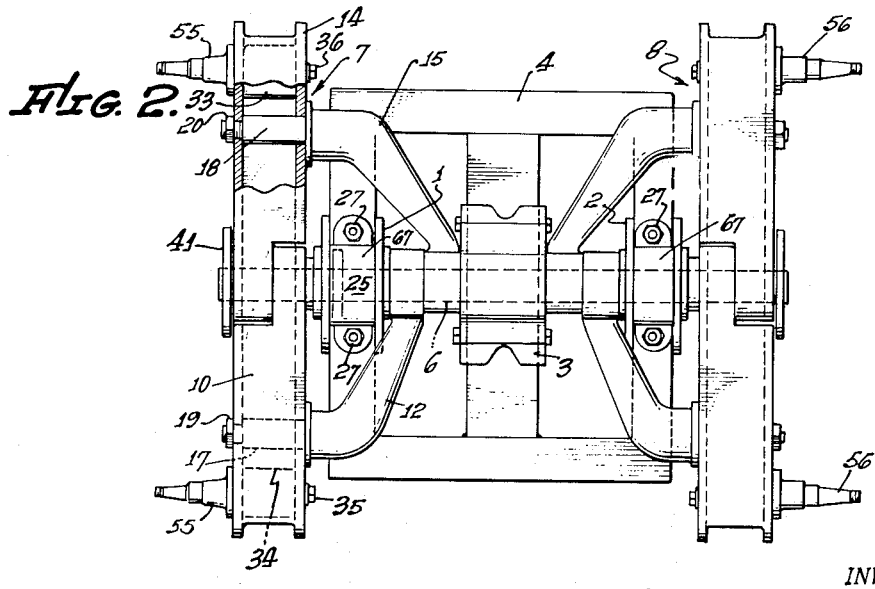
Fig. 2 is a bottom view of the device with the traction wheels removed therefrom for the sake of clearness.

Referring in the first instance to Figs. 1 and 2 of the drawings, it is noticed that posts 1, 2, 3 project from the under surface of the chassis frame 4. These posts are at the lower ends thereof shown perforated to provide seats for tubular stems on which the truck wheel suspension mechanism is supported. This mechanism consists of identically constructed and shaped right and left assemblies 7, 8 which are exactly alike. Description of one of the assemblies pertains for this reason equally to the other. Each assembly includes a rectangular box-shaped member 10, one end portion of which is reduced in width to about one-half of the other portion thereof. An angularly inclined, tubular arm 12 extends inwardly from the wider portion of the member and a tubular stem 13 projects outwardly from the narrower end of the member. The end of the arm is shown perforated to provide a seat for the stem 13. To an identically shaped second box-shaped member 14 are similarly secured another tubular arm 15 and a tubular stem 16. This arm is similarly perforated to ride on the end of the stem 16. From the inner ends of the arms project studs 17, 18 which are seated in perforations of the members 10, 14 and nuts 19, 20 serve to clamp the arms rigidly in position thereon after the assembly has been put together.

This mounting may be effected by seating the stem 13 of the box member 10 in the perforation of the post 1 which is of a diameter snugly to receive therein the stem. The arm 12 is thereupon pushed onto the stem until the stud 17 enters the member. The nut 19 is then applied to clamp this sub-assembly together. The stem 16 of the box member 14 may now be pushed into the stem 13 and the stud 18 of the arm 15 is similarly pushed into the box member 14 and clamped in position therein by the nut 20.

It is important to note that the post 1 terminates at the bottom in a bearing 21 which rides on the stem 13 and that a bracket 25 is seated in a groove 22 of the post. This bracket is made in two parts 66, 67 which by bolts and nuts 26, 27 are clamped together to bear on the bearing 21. The bracket is extended upwardly to form a plate 28 in the upper end of which studs 29 are seated and these studs extend through a larger opening 30 of the outer side wall 31 of the post 1. When so mounted it is seen that the bracket 25, is afforded freedom of oscillating movement on the bearing 21 within the limits of the opening 30 of the post.

The outer ends of the members 10, 14 are shown slotted to receive links 33, 34 riding on pivots 35, 36 of the members. The upper ends of these links are recessed to receive brackets 37, 38 and bolts 39 clamp the ends of the springs in position on these brackets. An arm 41 extends downward from the upper surface of the spring and the lower end of this arm is perforated rigidly to mount therein an inwardly directed thimble 42 which becomes seated in the end of the stem 13. A second arm 43 extends downward from the inner side edge of the spring along the outer surface of the outer side wall of the post 1. It is important to note that the studs 29, projecting from the plate 28 through the opening 30 in the post, are rigidly seated in the arm 43. In view of this, it is seen that the plate 28 of the bracket 25 and the arm 43, by means of the studs 29 are rigidly combined, together with the arm 41 to support the spring for swinging movement with the links 33, 34 on the bearing 21. It is to be noted that a tubular shaft 6 extends through the axially alined stems 16 of both wheel assemblies. The ends of this shaft are closed to receive bolts 44 connecting the shaft with the thimbles 42 axially to combine the two assemblies at each side of the vehicle for rotation in the posts 1, 2, 3 of the vehicle frame, substantially as indicated in Fig. 4. Also that bushings 50, 51 are placed within the bearings of the brackets 37, 38 and the seats in the lower ends of the links 33, 34. The bushings are composed of rubber or other suitable resilient material capable of giving service during the life of the assembly without the need of lubrication.

Spindle wheel bearings 55, 56 of any suitable standard construction extend from the pivots 35, 36 to support the inner wheels 57, 58 and an additional pair of wheels 59, 60 are mounted thereon in the usual manner. As in all vehicles of the type herein considered it is required also to provide brakes, but as such are well known and standardized, it is not thought necessary to burden the description with a detailed recital thereof.

It should be clear from the foregoing description that

I have provided a tandem wheel suspension of novel construction in which, by the elimination of conventional wheel axles, each tandem wheel assembly and each wheel of each assembly is resiliently mounted for independent yielding movement on interengaging tubular stems which, in turn, are seated for rotation in the posts 1, 2, 3 of the vehicle frame. This novel type of mounting enables each wheel to yield individually to absorb road shocks without any undue stress on the vehicle frame or any other part of the wheel suspension. It is further important to note that by making the wheel supporting box members 10, 14 and the tubular arms 12, 15 thereof of the shape illustrated in the drawings, a powerful framing is provided which will maintain the tandem wheels positively in correct alinement on the single central suspension axis formed by the interengaging tubular stems. The purpose of the inner shaft or stem 6 is merely to maintain the assemblies axially interlocked.

In many cases it is found preferable in place of the above described leaf spring arrangement to provide pneumatic cushions. This may be done substantially as indicated in Figs. 8 and 9 of the drawings. Outer and inner arms 63 and 64 take the place of the arms 41, 43. A beam 72 is by bolts 74, extending through spacers 73 of the arms, held mounted for rotation on the bearing 21. An air tank 75 is mounted below and parallel with the beam 72 and air cushions 70 are placed therebetween to form an air spring. The air pressure is in any conventional manner (not shown) automatically controlled and plates 71 are interposed to provide smooth and even seats for the air cushions. When such air springs are provided, it is found that the bouncing, chattering and bottom hitting of ordinary leaf springs may be entirely eliminated and the air pressure adjusted to fit any load condition.

But while a preferred form of the invention is illustrated in the drawings it is to be understood that other modifications of any portion thereof, within the scope of the claims hereto appended, may be embodied without departing from the spirit of the invention.

I claim:

1. A tandem wheel assembly for a vehicle having transversely alined posts downwardly extending from the frame thereof, the posts having axially alined bearings in the lower ends thereof, said assembly comprising, two longitudinally alined wheel supporting members, tubular stems laterally extending from the adjoining ends of the members, the stem of one member being seated for rotation in the stem of the other member, the ends of the stems being seated for rotation in the bearings of the posts, inwardly inclined braces mountable on the members near the free ends thereof, the braces having axially alined bearings at the ends thereof seatable on the stems of the members when the brackets are mounted in position thereon, a framing rising from the stems of the members and straddling the members, spring means mounted in the upper end of said framing, links extending from the free ends of the members to the ends of said spring means, and wheel supporting spindles projecting from the free ends of the members.

2. A tandem wheel assembly for a vehicle having transversely alined posts downwardly extending from the frame thereof, the posts having axially alined bearings in the lower ends thereof, said assembly comprising, two longitudinally alined rectangular box-shaped wheel supporting members, the members being at the adjoining ends thereof reduced right and left to one-half the width of the members, tubular stems laterally extending from the adjoining narrow ends of the members, the stem of one member being seated for rotation in the stem of the other member, the ends of the stems being seated for rotation in the bearings of the posts, inwardly inclined braces mountable on the members near the free ends thereof, the braces having axially alined bearings at the ends thereof seatable on the stems of the members when the brackets are mounted in position thereon, a framing rising from the stems of the members and straddling the members, spring means mounted in the upper end of said framing, links extending from the free ends of the members to the ends of said spring means, and wheel supporting spindles projecting from the free ends of the members.

3. A tandem wheel assembly for a vehicle having transversely alined posts downwardly extending from the frame thereof, the posts having axially alined bearings in the lower ends thereof, said assembly comprising, two longitudinally alined wheel supporting members, tubular stems laterally extending from the adjoining ends of the members, the stem of one member being seated for rotation in the stem of the other member, the ends of the stems being seated for rotation in the bearings of the posts, pivots in the free ends of the members, inwardly inclined braces mountable on the members near free ends thereof, the braces having axially alined bearings at the ends thereof seatable on the stems of the members when the brackets are mounted in position thereon, a framing rising from the stems of the members and straddling the members, spring means mounted in the upper end of said framing, pivots in the ends of said spring means, links extending from the pivots at the free ends of the members to the pivots at the ends of said spring means, and wheel supporting spindles projecting from the pivots at the free ends of the members.

4. Two tandem wheel assemblies for a vehicle having a central post and two side posts downwardly extending from the frame thereof, the lower ends of the post having axially alined transversely directed bearings therein, the lower portions of the side posts being bifurcated, the outer wall of the bifurcated portion of each side post having a passage therethrough, each wheel assembly comprising, two longitudinally alined wheel supporting members, tubular stems laterally extending from the adjoining ends of the members, the stem of one member being seated for rotation in the stem of the other member, the ends of the stems being seated for rotation in the bearings of the posts, inwardly inclined braces mountable on the members near the free ends thereof, the braces having axially alined bearings at the ends thereof seatable on the stems of the members when the brackets are mounted in position thereon, a framing rising from the stems of the members and straddling the members, the inside member of said framing extending freely through the bifurcated post passage, spring means mounted in the upper end of said framing, links extending from the free ends of the members to the ends of said spring means, and wheel supporting spindles projecting from the free ends of the members.

5. Two tandem wheel assemblies for a vehicle having a central post and two side posts downwardly extending from the frame thereof, the lower ends of the posts having axially alined transversely directed bearings therein, the lower portions of the side posts being bifurcated, the outer wall of the bifurcated portion of each side post having a passage therethrough, each wheel assembly comprising, two longitudinally alined wheel supporting members, tubular stems laterally extending from the adjoining ends of the members, the stem of one member being seated for rotation in the stem of the other member, the ends of the stems being seated for rotation in the bearings of the posts, pivots in the free ends of the members, inwardly inclined braces mountable on the members near the free ends thereof, the braces having axially alined bearings at the ends thereof seatable on the stems of the members when the brackets are mounted in position thereon, a framing rising from the stems of the members and straddling the members, spring means mounted in the upper end of said framing, pivots in the ends of said spring means, links seated on and extending from the pivots of the free ends of the members to the pivots of the ends of said spring means, and wheel supporting spindles projecting from the pivots at the free ends of the members.

6. Two tandem wheel assemblies for a vehicle having a central post and two side posts downwardly extending from the frame thereof, the lower ends of the posts having axially alined transversely directed bearings therein, the lower portions of the side posts being bifurcated, the outer wall of the bifurcated portion of each side post having a passage therethrough, each wheel assembly comprising, two longitudinally alined wheel supporting members, tubular stems laterally extending from the adjoining ends of the members, the stem of one member being seated for rotation in the stem of the other member, the ends of the stems being seated for rotation in the bearings of the posts, inwardly inclined braces mountable on the members near the free ends thereof, the braces having axially alined bearings at the ends thereof seatable on the stems of the members when the brackets are mounted in position thereon, a framing rising from the stems of the members and straddling the members, the inner side member of said framing extending freely through the bifurcated post passage, spring means mounted in the upper end of said framing, links extending from the free ends of the members to the ends of said spring means, wheel supporting spindles projecting from the free ends of the members, and an element seatable in the stems to maintain the assemblies in position transversely.

7. Two tandem wheel assemblies for a vehicle having a central post and two side posts downwardly extending from the frame thereof, the lower ends of the posts having axially alined transversely directed bearings therein, the lower portions of the side posts being bifurcated, the outer wall of the bifurcated portion of each side post having a passage therethrough, each wheel assembly comprising, two longitudinally alined wheel supporting members, tubular stems laterally extending from the adjoining ends of the members, the stem of one member being seated for rotation in the stem of the other member, the ends of the stems being seated for rotation in the bearings of the posts, pivots in the free ends of the members, inwardly inclined braces mountable on the members near the free ends thereof, the braces having axially alined bearings at the ends thereof seatable on the stems of the members when the brackets are mounted in position thereon, a framing rising from the stems of the members and straddling the members, the inner side member of the framing extending freely through the bifurcated post passage, the outer side member of the framing having a thimble-shaped stud inwardly projecting therefrom to seat in the inner tubular stem, means engaging the closed ends of the thimble-shaped studs to maintain the parts of both assemblies correctly positioned transversely.

8. Two tandem wheel assemblies for a vehicle having a central post and two side posts downwardly extending from the frame thereof, the lower ends of the posts having axially alined transversely directed bearings therein, the lower portions of the side posts being bifurcated, the outer wall of the bifurcated portion of each side post having a passage therethrough, each wheel assembly comprising, two longitudinally alined wheel supporting members, tubular stems laterally extending from the adjoining ends of the members, the stem of one member being seated for rotation in the stem of the other member, the ends of the stems being seated for rotation in the bearings of the posts, pivots in the free ends of the members, inwardly inclined braces mountable on the members near free ends thereof, the braces having axially alined bearings at the ends thereof seatable on the stems of the members when the brackets are mounted in position thereon, a framing rising from the stems of the members and straddling the members, spring means mounted in the upper end of said framing, pivots in the ends of said spring means, links seated on and extending from the pivots of the free ends of the members to the pivots of the ends of said spring means, resilient bushings within the bearings of said links, and wheel supporting spindles projecting from the pivots at the free ends of the members.

References Cited in the file of this patent
UNITED STATES PATENTS

| | | |
|---|---|---|
| 1,887,042 | Rogers | Nov. 8, 1932 |
| 2,172,173 | Peterman | Sept. 5, 1939 |